(12) United States Patent
Hautson et al.

(10) Patent No.: US 9,507,443 B2
(45) Date of Patent: Nov. 29, 2016

(54) SYSTEM AND METHOD FOR PLOTTING THE MARK DRAWN ON A WRITING MEDIUM (71) Applicant: Commissariat à l'énergie atomique et aux énergies alternatives, Paris (FR)

(72) Inventors: Tristan Hautson, Fontaine (FR); Timothée Jobert, Grenoble (FR); Jean-Luc Vallejo, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 89 days.

(21) Appl. No.: 14/299,192

(22) Filed: Jun. 9, 2014

(65) Prior Publication Data
US 2014/0362057 A1 Dec. 11, 2014

(30) Foreign Application Priority Data
Jun. 7, 2013 (FR) .................................... 13 55265

(51) Int. Cl.
*G06F 3/033* (2013.01)
*G06F 3/0354* (2013.01)
*G06F 3/046* (2006.01)
*B43K 24/02* (2006.01)
*B43K 29/08* (2006.01)

(52) U.S. Cl.
CPC .......... *G06F 3/03545* (2013.01); *B43K 24/02* (2013.01); *B43K 29/08* (2013.01); *G06F 3/046* (2013.01)

(58) Field of Classification Search
None
See application file for complete search history.

(56) References Cited

U.S. PATENT DOCUMENTS

| 5,134,689 | A | * | 7/1992 | Murakami | G06F 3/046 345/177 |
| 6,263,230 | B1 | | 7/2001 | Haynor et al. | |
| 6,269,324 | B1 | | 7/2001 | Rakijas et al. | |
| 7,145,555 | B2 | * | 12/2006 | Taylor | G06F 3/0346 178/18.01 |
| 7,982,713 | B2 | * | 7/2011 | Choi | G06F 3/03544 345/158 |

(Continued)

FOREIGN PATENT DOCUMENTS

WO    WO 02/43045    5/2002

*Primary Examiner* — Dismery Mercedes
(74) *Attorney, Agent, or Firm* — Occhiuti & Rohlicek LLP (57) ABSTRACT A system for plotting a mark drawn on a writing medium, comprising a tool including a first and a second permanent magnet. The first permanent magnet is mechanically linked to a tip. There is a network of magnetometers having N triaxial magnetometers and an electronic computer programmed in order to: a) determine, from the measurements from the triaxial magnetometers, the positions of the two permanent magnets and the orientations of the magnetic moments of said two permanent magnets and b) calculate the relative position and/or relative orientation of the magnetic moment of the first permanent magnet in relation to the orientation of the magnetic moment of the second permanent magnet from the results of step a). The calculated relative position and/or orientation is then used by a device as a value of a physical quantity that is representative of the pressure exerted on the tip.

11 Claims, 2 Drawing Sheets

(56) References Cited

U.S. PATENT DOCUMENTS

| | | | |
|---|---|---|---|
| 8,259,091 B2* | 9/2012 | Yeh | G06F 1/1626 178/19.01 |
| 8,978,487 B2* | 3/2015 | Fergusson | G06F 3/03545 345/179 |
| 9,195,351 B1* | 11/2015 | Rosenberg | G06F 1/1626 |
| 2002/0134594 A1* | 9/2002 | Taylor | G06F 3/0346 178/18.01 |
| 2002/0171427 A1 | 11/2002 | Wiegert et al. | |
| 2003/0095115 A1* | 5/2003 | Brian | G06F 3/0346 345/179 |
| 2004/0144575 A1* | 7/2004 | Zloter | G06F 3/03545 178/19.02 |
| 2005/0140663 A1* | 6/2005 | Nakamura | G06F 1/1626 345/179 |
| 2011/0304577 A1* | 12/2011 | Brown | G06F 3/03545 345/174 |
| 2013/0009907 A1* | 1/2013 | Rosenberg | G06F 3/046 345/174 |
| 2013/0218516 A1* | 8/2013 | Yu | G01B 7/004 702/150 |
| 2014/0168175 A1* | 6/2014 | Mercea | G06F 3/03545 345/179 |
| 2014/0267150 A1* | 9/2014 | Masashi | G06F 3/046 345/174 |

* cited by examiner

SYSTEM AND METHOD FOR PLOTTING THE MARK DRAWN ON A WRITING MEDIUM

RELATED APPLICATIONS

Under 35 USC 119, this application claims the benefit of the priority date of French Patent Application FR 1355265, filed on Jun. 7, 2013, the contents of which are herein incorporated by reference.

FIELD OF THE INVENTION

The invention concerns a system and a method for plotting the mark drawn on a writing medium. The invention likewise concerns a tool and a device for said plotting system. It also concerns an information recording medium for implementing said method.

BACKGROUND

Such systems are particularly useful for digitizing a drawing produced by hand on the writing medium, using a tool, by a human being. In this case, the tool is chosen from the group composed of a pencil and an eraser.

In this case, pencil denotes any tool that is directly manipulable by the hand of a human being in order to draw on the physical writing medium. In some cases, the pencil leaves a mark on the writing medium. The mark is then generally directly visible to the naked eye by a human being. In order to leave a directly visible mark on the medium, the pencil deposits a coloured liquid or solid on the writing medium. The coloured liquid is typically an ink or paint. The coloured solid is graphite, for example. In other cases, the pencil does not deposit a coloured liquid or solid on the writing medium. In this case, the pencil is often called a "stylus". The plotted mark is then generally displayed on a screen.

In this case, eraser denotes any tool that is directly manipulable by the hand of a human being in order to draw on a physical writing medium a mark that, when it encounters a mark left by the pencil, erases the mark left by said pencil. The erasure includes digital data erasure of a mark recorded using a pencil. Moreover, if appropriate, the erasure may also be physical erasure of the mark on the medium. By way of example, the physical erasure of the mark on the medium may be the result of a chemical reaction and/or of a mechanical effect such as abrasion. Unlike the pencil, the mark drawn by the eraser is generally not visible to the naked eye.

In this case, "drawing" includes the event of running a tip of the tool over the writing medium in order to write or erase.

The writing medium is a sheet of paper, a canvas, a picture, a tablet or any other medium on which it is possible to draw.

In order to correctly plot the mark drawn by said tip on a writing medium, it is important to take into account the pressure exerted on the tip. By way of example, the pressure exerted on the tip allows precise detection of the existence of a point of contact between the tip of the tool and the writing medium. Now, every time the tip is no longer in contact with the writing medium, the plotted mark needs to be interrupted. It is also often desirable, in order to obtain a more realistic plot, to vary the width of the plotted mark or the luminous intensity of the plotted mark on the basis of the pressure exerted on the tip.

In this context, known systems for plotting the mark drawn on a writing medium have:
- a tool, chosen from the group composed of a pencil and an eraser, said tool comprising:
  - a body forming a means for grasping the tool with a hand of a user,
  - a tip intended to draw the mark to be plotted, said tip being movable by the reactive force exerted by the writing medium when said tip comes to rest on said writing medium, between:
- a prominent position and
- a retracted position in which the tip is pushed inside the body more than in the prominent position,
  - return means continually driving the tip towards its prominent position,
  - a first and a second, separate, permanent magnet, the first permanent magnet being mechanically linked to the tip so as to be moved translationally or rotationally, in relation to the second permanent magnet, as the tip is moved between its prominent and retracted positions,
- a device that is capable of recording successive positions for a point of contact between the tip and the medium in order to form the plot of the drawn mark, and of using a value of a physical quantity that is representative of the pressure exerted on the tip of the tool in order to control or complete said recording.

By way of example, such a system is disclosed in the patent application WO 02/043045 or the application US2003/095115A.

In this prior art patent application, the position of the tip of the pencil is determined by measuring, using trigonometry, the position of a permanent magnet housed inside said pencil. This involves the use of three triaxial magnetometers arranged on the writing medium. This system is particularly advantageous in that, in order to locate the pencil, the latter is solely equipped with permanent magnets and therefore does not need to be powered from a power source. Such a pencil that does not need to be powered is termed "passive". However, in the application WO 02/043045, when the inclination of the pencil is modified, this brings about modification of the amplitude of the magnetic field measured by the triaxial magnetometers, which translates into modification of the plotted position of the tip of the pencil. Thus, modifying the inclination of the pencil in the system of WO 02/043045 can bring about the appearance of an unwanted space in the mark plotted by said system.

Moreover, in order to complete the plot of the mark on the basis of a physical quantity that is representative of the pressure exerted on the tip, and not simply to detect a point of contact, the application WO 02/043045 teaches, with reference to FIGS. 14 and 15, that it is necessary to incorporate into the pencil a pressure sensor and a transmitter for transmitting the measured pressure. Thus, as soon as there is an attempt to determine the pressure exerted on the tip of the pencil, the pencil can no longer be "passive".

It will also be noted that, furthermore, the application WO 02/043045 claims that a passive pencil equipped with two permanent magnets can be used to detect the instant at which the tip of the pencil comes into contact with the writing medium while preserving a passive pencil. More precisely, in the embodiment in FIG. 6, the application WO 02/043045 states that the contact between the tip and the writing medium causes the first permanent magnet to be placed on the second permanent magnet so that the first and second permanent magnets now form only a single large permanent magnet that radiates a magnetic field of much greater intensity. In FIG. 6, the first and second permanent magnets bear the references 62 and 64, respectively. It is this variation in the intensity of the radiated magnetic field that is measured and allows a point of contact to be detected. However, this embodiment does not work. The reason is that the increase in the magnetic field is due to the fact that the magnet 64 is going closer to the plane of the sheet and therefore to the triaxial magnetometers. In point of fact, the same variation in the amplitude of the magnetic field can be obtained by modifying the inclination of the pencil in relation to the plane of the sheet. It is therefore not possible to discern a variation in the measured amplitude of the magnetic field that is caused by the coming-together of the magnets 62 and 64 from a variation in this measured amplitude that is caused by the inclination of the pencil. Thus, in practice, the embodiment described in FIG. 6 therefore cannot be used to detect a point of contact between the tip of the pencil and a sheet.

The prior art is likewise known from: US2013/009907A1.

SUMMARY

It is an aim of the invention to propose a system for plotting the mark drawn on the writing medium in which a physical quantity that is representative of the pressure exerted on the tip of the pencil is used while preserving the possibility of having a passive pencil. The invention therefore relates to a plotting system according to Claim 1.

In the system above, the first permanent magnet is moved counter to the return force of the return means. Therefore, the movement of the first permanent magnet in relation to the second permanent magnet is a physical quantity that is representative of the pressure exerted on the tip of the tool.

Owing to the large number of triaxial magnetometers, to the known position of said magnetometers in relation to one another and to the computer programmed to this end, the movement of the first permanent magnet in relation to the second permanent magnet is estimated. There is thus obtained a value that varies on the basis of the pressure exerted on the tip of the tool without it being necessary to equip said tool with a pressure sensor or with means for transmitting the pressure measured by said sensor to an external electronic computer. The system for plotting a mark above can therefore both use a passive tool and use the value of a physical quantity that is representative of the pressure exerted on the tip.

The embodiments of said system may have one or more of the features of the dependent system claims.

Said embodiments of the system moreover exhibit the following advantages:
  using the same magnet to determine the position of the tip and to determine the value of the physical quantity that is representative of the pressure exerted on said tip simplifies the realization of the system and makes it possible to avoid the unwanted generation of spaces in the plotted mark;
  using a guide that allows the first permanent magnet to be kept centered on the longitudinal axis of the tool allows the orientation of said axis to be measured while eliminating the measurement errors over the directions of the magnetic moments of the permanent magnets housed inside the pencil;
  using two permanent magnets for which the directions of the magnetic moments have an angular shift moreover allows the angle of roll of the tool about a longitudinal axis to be plotted without complicating the realization of said tool.

The invention likewise relates to a tool according to Claim 5.

The embodiments of said tool may have one or more of the features of the dependent tool claims.

Said embodiments of the tool moreover exhibit the following advantages:
  using the first and second permanent magnets moreover to realize the means for returning the tip allows the realization of the tool to be simplified.

The invention likewise relates to a device for the plotting system above according to Claim 8.

The invention likewise relates to a method for plotting the mark drawn on a writing medium according to Claim 9.

The embodiments of said method may have one or more of the features of the dependent method claims.

Finally, the invention likewise relates to an information recording medium having instructions for realizing steps d) and e) of the method above when said instructions are executed by an electronic computer.

The invention will be better understood upon reading the description that follows, which is given solely by way of nonlimiting example.

DETAILED DESCRIPTION

In these figures, the same references are used to denote the same elements.

In the remainder of this description, the features and functions that are well known to a person skilled in the art are not described in detail.

The invention will now be described in the particular case in which the tool is a pencil.

Figure 1:
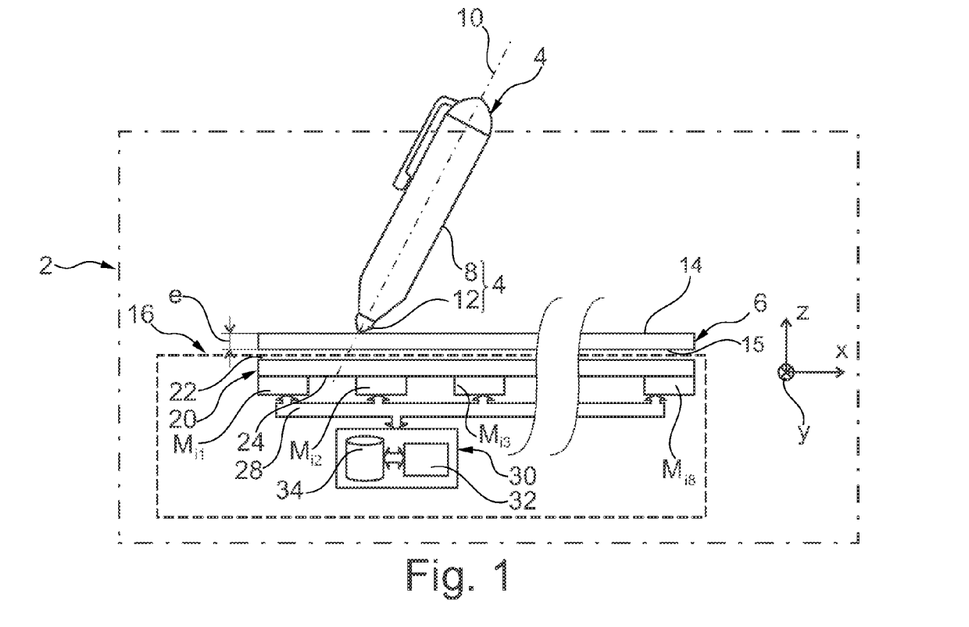
FIG. 1 is a schematic illustration of a system for plotting the mark from the tip of a pencil on a writing medium.

FIG. 1 shows a system 2 for plotting the mark from the tip of a pencil 4 on a writing medium 6.

The pencil 4 is freely movable directly by the hand of a human being in a reference frame XYZ that is fixed without any degree of freedom to the system 2. In this case, the directions X and Y in this reference frame are horizontal and the direction Z is vertical. Subsequently, the terms "above", "below", "upper", "lower" relate to said vertical direction Z.

The pencil 4 typically weighs less than 1 kg and, preferably, less than 200 g or even less than 100 g. The dimensions of said pencil are likewise sufficiently small for it to be held in a single hand by a human being. The pencil 4 generally exhibits an oblong shape.

In this case, the pencil 4 is chosen from the group composed of a ballpoint pen, a fountain pen, a nib pen, a felt-tip pen, a wooden pencil, a marker, a highlighter, a reed pen, a quill, a brush. In this embodiment, by way of illustration, the pencil 4 is a nib pen.

The pencil 4 has an oblong body 8 extending along a longitudinal axis 10. This body serves as a means for grasping the pencil with the hand of the user who wishes to draw on the medium 6.

By way of example, the body 8 is entirely produced in nonmagnetic materials, that is to say materials that do not exhibit any magnetic property that can be measured by the system 2.

The pencil 4 also has a tip 12 that deposits a coloured liquid or solid on an upper face 14 of the writing medium 6. To this end, by way of example, the tip 12 is intended to be dipped into a reservoir of coloured liquid. The coloured liquid is ink, for example. In the specific case of a nib pen, the tip 12 is the nib of said pen. The tip 12 is situated on the axis 10 at the lower end of the pencil 4. In this embodiment, the tip 12 does not exhibit any symmetry of revolution about the axis 10. Therefore, the mark left by said tip 12 on the medium 6 depends on the angle of roll of the pencil 4 about the axis 10. In the case of the nib of a nib pen, the latter cannot correctly deposit ink on the medium 6 unless it is correctly oriented in relation to the medium 6.

The pencil 4 has two magnetic objects. Said magnetic objects and the pencil 4 are described in more detail with reference to FIG. 3.

By way of example, the medium 6 is a conventional writing medium exhibiting a non-zero thickness e in the direction Z. In this case, the thickness e is supposed to be constant over the entire face 10. The thickness e may be any thickness. In particular, this thickness e may be very small, that is to say less than 1 mm or less than 0.5 mm in the case of a sheet of paper or a canvas. The thickness e may also be very large, that is to say greater than 5 mm in the case of a notebook or a memo pad.

The medium 6 may be rigid or flexible. By way of example, a rigid medium is a glass or metal plate. A flexible medium is a sheet of paper.

The surface of the face 14 is sufficiently large to allow writing or drawing. To this end, it is typically greater than 6 cm$^2$ or 20 cm$^2$ or even greater than 100 cm$^2$.

The medium 6 likewise exhibits a lower face 15 on the side opposite the face 10.

The system 2 has a device 16 that is capable, on the basis of the position and the orientation that are measured for the magnetic objects of the pencil 4:
of locating the tip 12 in the reference frame XYZ, and
of determining the value of a physical quantity that is representative of the pressure exerted on the tip 12.

In FIG. 1, the vertical wavy lines indicate that a portion of the appliance 16 has not been shown.

The appliance 16 comprises a tablet 20 including a front support face 22 and a rear face 24. Said tablet is typically free from an electrical or electronic circuit. It may be produced from a single block of material, for example.

The face 22 extends horizontally. The lower face 15 of the medium 6 is set down directly on the face 22. The surface of the face 22 is sufficiently large to allow writing or drawing. Typically, it is greater than 20 or 100 cm$^2$.

The tablet 20 is produced in a rigid nonmagnetic material. By way of example, the Young's modulus of the tablet 20 is greater than 2 or 10 or even greater than 50 GPa at 25° C. Moreover, the thickness thereof is sufficient so as not to bend under the pressure exerted by the hand of the user when the latter is writing on the medium 6 using the pencil 4. By way of example, the tablet 20 includes a glass plate whose thickness is greater than 1 mm or 4 mm.

The appliance 16 has a network of N triaxial magnetometers $M_{ij}$. This network allows the two magnetic objects of the pencil 4 to be located in the reference frame XYZ. Location of a magnetic object is understood in this case to mean the determination of the position x, y, z of said object in the reference frame XYZ and also the orientation thereof in relation to the directions X, Y and Z of the reference frame XYZ. By way of example, the orientation of the magnetic object is shown by the angles $\theta_x$, $\theta_y$ and $\theta_z$ of the magnetic moment of said object, respectively, in relation to the axes X, Y and Z of the reference frame.

Typically, N is greater than five and, preferably, greater than sixteen or thirty two. In this case, N is greater than or equal to sixty four.

In this embodiment, the magnetometers $M_{ij}$ are aligned in rows and columns in order to form a matrix. In this case, this matrix has eight rows and eight columns. The indices i and j identify the row and the column, respectively, of said matrix, at the intersection of which there is the magnetometer $M_{ij}$. In FIG. 1, only the magnetometers $M_{i1}$, $M_{i2}$, $M_{i3}$, $M_{i4}$ and $M_{i8}$ in a row i can be seen. The position of the magnetometers $M_{ij}$ in relation to one another is described in more detail with reference to FIG. 2.

Each magnetometer $M_{ij}$ is fixed without any degree of freedom to the other magnetometers. To this end, the magnetometers $M_{ij}$ are fixed without any degree of freedom on the rear face 24 of the tablet 20.

Each magnetometer $M_{ij}$ measures the direction and the intensity of the magnetic field generated by magnetic objects. For this, each magnetometer $M_{ij}$ measures the norm of the orthogonal projection of the magnetic field generated by the magnetic objects at the level of said magnetometer $M_{ij}$ on at least three axes of measurement for said magnetometer. In this case, these three axes of measurement are orthogonal to one another. By way of example, the axes of measurement of each of the magnetometers $M_{ij}$ are respectively parallel to the directions X, Y and Z of the reference frame. The sensitivity of the magnetometer $M_{ij}$ is less than $10^{-6}$ T or $10^{-7}$ T, for example.

Each magnetometer $M_{ij}$ is connected by means of a bus 28 for transmitting information to a processing unit 30.

Figure 4:
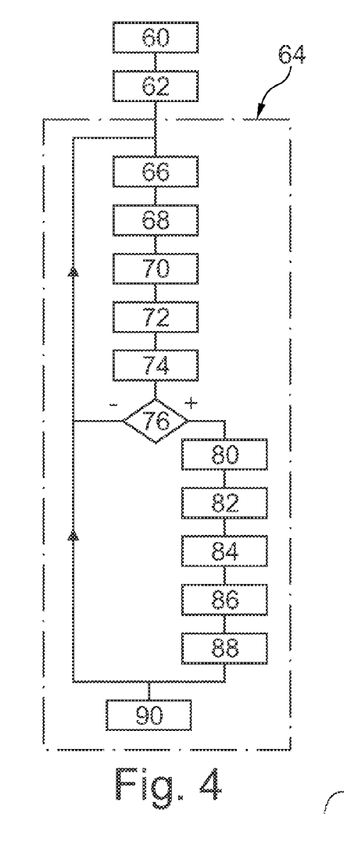
FIG. 4 is a flowchart for a method for plotting the mark from the tip of a pencil on a writing medium using the system from FIG. 1.

The processing unit 30 is capable of implementing the method from FIG. 4. In particular, it is capable of determining the position and the orientation, in the reference frame XYZ, of the two magnetic objects that are simultaneously present in the pencil 4 from the measurements from the magnetometers $M_{ij}$. To this end, the unit 30 has a programmable electronic computer 32 that is capable of executing instructions recorded on an information recording medium. The unit 30 therefore also has a memory 34 containing the instructions that are necessary for the execution of the method from FIG. 4 by the computer 32. In this case, each magnetic object that is contained in the pencil 4 is likened to a magnetic dipole. The unit 30 therefore implements a mathematical model $M_2$ associating each measurement from a magnetometer $M_{ij}$ with the positions, orientations and amplitudes of the magnetic moments of two magnetic dipoles in the reference frame XYZ. This model $M_2$ is presented in the form of a system of equations in which a first set of variables represents the positions and orientations of the two magnetic dipoles and the amplitudes of the magnetic moments of said dipoles. A second set of variables represents the measurements from the magnetometers $M_{ij}$. In order to obtain the positions, orientations and amplitudes of the magnetic moments of the two magnetic dipoles, the variables in a first set are the unknowns and the values of the variables in the second set are known. This model is typically constructed from the physical electromagnetism equations. Said model is parameterized by the known distances between the magnetometers $M_{ij}$. In order to construct said model, each permanent magnet is approximated by a magnetic dipole. This approximation introduces only very few errors if the distance between the permanent magnet and the magnetometer $M_{ij}$ is greater than 2 L and preferably greater than 3 L, where L is the largest dimension of the permanent magnet. Typically, L is lower than 20 cm and preferably lower than 10 or even 5 cm.

In this case, the model $M_2$ is nonlinear. The unit 30 resolves it by implementing an algorithm for estimating a solution thereto. By way of example, the algorithm used is an Unscented Kalman Filter.

Given that each magnetic dipole is characterized by three variables to distinguish its position, two variables to distinguish its orientation and one variable to distinguish the amplitude of its magnetic moment, no fewer than four magnetometers $M_{ij}$ are required in order to locate two magnetic dipoles. Preferably, N is chosen to be five, ten or twenty times higher than this minimum number of magnetometers in order to have redundant measurements. The redundancy of the measurements allows an improvement in the precision of the location of the dipoles.

The unit 30 is likewise capable of acquiring and recording the mark left by the tip 12 on the medium 6 from the various positions determined for said tip.

Figure 2:
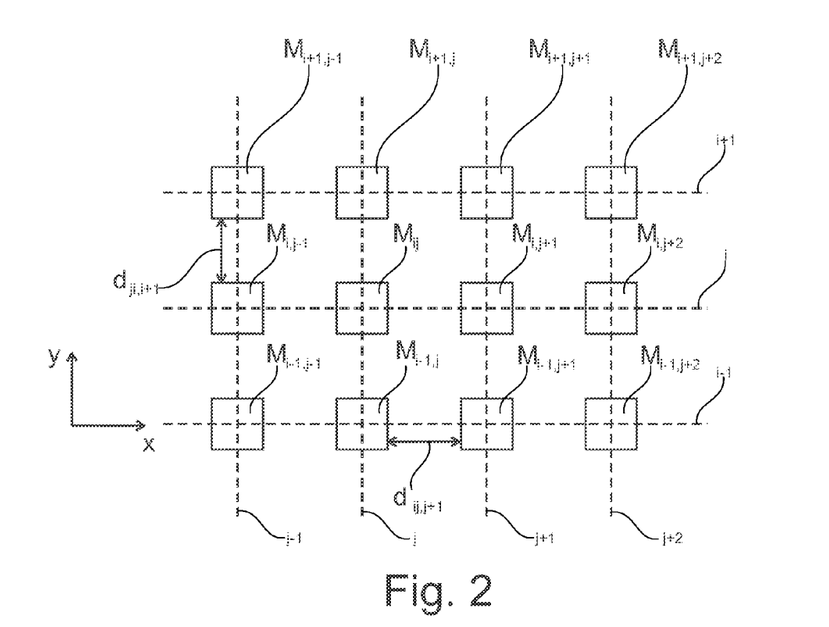
FIG. 2 is a schematic illustration of a portion of a network of magnetometers that is used in the system from FIG. 1.

FIG. 2 shows some of the magnetometers $M_{ij}$ of the appliance 16. Said magnetometers $M_{ij}$ are aligned in rows i parallel to the direction X. Said magnetometers are likewise aligned in columns j parallel to the direction Y in order to form a matrix. The rows i and the columns j are arranged in the order of ascending indices.

The center of the magnetometer $M_{ij}$ is situated at the intersection of the row i and the column j The center of the magnetometer corresponds to the point at which the magnetic field is measured by said magnetometer. In this case, the indices i and j pertain to the range [1; 8].

The centers of two magnetometers $M_{ij}$ and $M_{ij+1}$ that are immediately consecutive along a row i are separated by a distance $d_{i,j,j+1}$. Similarly, the center of two magnetometers $M_{ij}$ and $M_{i+1,j}$ that are immediately consecutive along one and the same column j are separated by a distance $d_{j,i,i+1}$.

In this case, whatever the row i, the distance $d_{i,j,j+1}$ is the same. Said distance is therefore denoted $d_j$. Similarly, whatever the column j, the distance $d_{j,i,i+1}$ between two magnetometers is the same. Said distance is therefore denoted $d_i$.

In this particular embodiment, the distances $d_i$ and $d_j$ are both equal to d.

Typically, the distance d is between 1 and 4 cm when:
the power of the permanent magnet is 0.5 A·m², 
the sensitivity of the magnetometers is $4*10^{-7}$ T, and
the number of magnetometers $M_{ij}$ is sixty four.

Figure 3:
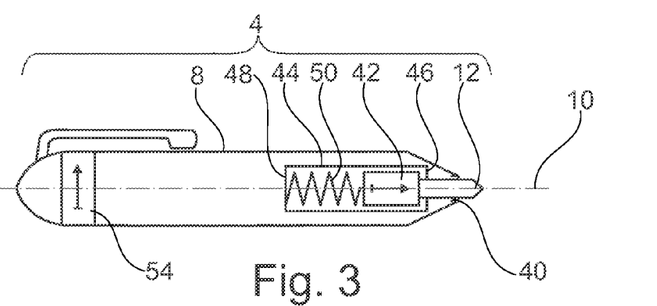
FIG. 3 is a schematic illustration of a pencil that is used in the system from FIG. 1.

FIG. 3 shows the pencil 4 in more detail. Said pencil 4 has the tip 12 mounted so as to slide inside an orifice 40 that is made in a distal end of the body 8. The tip 12 slides along the axis 10 between a prominent position (shown in FIG. 3) and a retracted position. In the prominent position, the tip 12 protrudes beyond the body 8 so as to be able to come into contact with the medium 6 in order to draw a mark. In the retracted or pushed-in position, the tip 12 is pushed inside the body 10 more than in the prominent position.

The end of the tip 12 concealed inside the body 8 is fixed without any degree of freedom to a magnetic object 42.

The object 42 exhibits a magnetic moment that can be measured by the appliance 16. Typically, it is made up of ferromagnetic or ferrimagnetic material. In this case, the object 42 is a permanent magnet. Said magnet 42 exhibits a non-zero magnetic moment even in the absence of an external magnetic field. By way of example, the coercive magnetic field of said magnet 42 is greater than 100 A·m⁻¹ or 500 A·m⁻¹. The power of the magnet 42 is typically higher than 0.01 A·m² or 0.1 A·m².

In this case, the magnet 42 has the shape of a rectilinear bar extending along the axis 10. The transverse section of said bar is rectangular, for example. The largest dimension of said magnet 42, that is to say in this case the length L thereof, is typically less than 5 cm and preferably less than 3 cm or even less than 2 cm. The magnetic moment of the magnet 42, shown by an arrow in FIG. 3, is coincident with the axis 10 and directed towards the tip 12.

The magnet 42 is moved translationally along the axis 10 by the tip 12. To this end, the pencil 4 has a guide 44 inside which the magnet 42 slides. Said guide 44 only allows the translation of the magnet 42 along a portion of the axis 10. By way of example, it is a hollow tube whose transverse section is slightly greater than that of the magnet 42.

In order to limit the travel of the magnet 42, the guide 44 has two stops 46 and 48. The magnet 42 bears against the stop 46 when the tip 12 is in its prominent position, that is to say when no pressure capable of pushing said tip 12 inside the body 8 is exerted. Said stop 46 prevents the tip 12 from leaving the body 8 further forward than its prominent position.

The stop 48 is situated on the side opposite the stop 46. The stop 48 is sufficiently far from the stop 46 for the magnet 42 not to be able to come to rest on the stop 48 in normal operation.

Return means 50 for continually driving the tip 12 towards its prominent position are provided inside the body 8. Said return means are in this case made using an elastically deformable material that does not consume electric power in order to operate. In this case, the return means 50 have a spring such as a helical spring. Said spring continually rests firstly on the stop 48 and secondly on the end of the magnet 42 that is situated on the side opposite the tip 12.

The pencil 4 likewise has a second magnetic object 54. In this case, the object 54 is fixed without any degree of freedom to the body 8 at a distance that is sufficiently far from the magnet 42 for the magnet 42 not to be able to come into contact with said object 54 even when the tip is in its retracted position. Typically, the minimum distance that separates the magnets 42, 54 is greater than or equal to, and preferably 1.5 times greater than, the distance d that separates two immediately consecutive magnetometers $M_{ij}$. By way of example, the shortest distance that separates the object 54 from the magnet 42 is greater than 5 cm in this case.

In this embodiment, the object 54 is likewise a permanent magnet. By way of example, said permanent magnet is identical to the magnet 42 except that its magnetic moment, shown by an arrow in FIG. 3, forms an angle β with the magnetic moment of the magnet 42 in a plane containing the directions of said two magnetic moments. Typically, the angle β is between 5 and 175° and preferably between 45 and 135°. In this case, the angle β is equal to 90° plus or minus 5°.

The operation of the system 2 will now be explained with reference to the method from FIG. 4.

The method from FIG. 4 starts with a step 60 of supplying the system 2 for plotting the drawn mark.

Next, in a step 62, the system 2 is initialized. In particular, in said step 62, the distance $d_0$ separating the permanent magnets 42 and 54 in the absence of pressure on the tip 12 is recorded in the memory 34. Said distance $d_0$ is equal to the distance between the positions measured by the appliance 16 for the magnets 42 and 54 in the absence of pressure on the tip 12. This distance $d_0$ is either determined experimentally using the appliance 16 or calculated from the dimensions of the pencil 4 and the positions of the permanent magnets 42 and 54. Said distance can easily be updated experimentally using the appliance 16 because it corresponds to the maximum distance between the magnets. In this embodiment, a distance $d_{min}$ corresponding to the minimum distance that can exist between the two magnets 42, 54 is likewise recorded while the pencil is being used. This distance $d_{min}$ is determined in the same way as the distance $d_0$.

In step 62, a threshold $S_p$ for the start of pressure on the tip is likewise recorded in the memory 34. Finally, in this step, the constant distance $d_p$ that separates the distal end of the tip 12 from the position of the magnetic dipole corresponding to the magnet 42 is likewise recorded in the memory 34. This distance is measured directly on the pencil 4.

The initialization thereof is followed by a phase 64 of use of the system 2 in order to plot the mark drawn by a user using the pencil 4.

In this phase, the magnetic fields generated by the permanent magnets 42 and 54 are measured, in a step 66, by the magnetometers $M_{ij}$.

Next, in a step 68, said measurements are acquired by the processing unit 30.

In a step 70, the unit 30 uses the measurements acquired to determine two positions $P_1$ and $P_2$ and the coordinates of two vectors $M_1$ and $M_2$. The positions $P_1$ and $P_2$ are the coordinates in the reference frame XYZ for the centre of the dipoles $D_1$ and $D_2$, respectively. Said dipoles $D_1$ and $D_2$ correspond to the permanent magnets 42 and 54, respectively. The norms for the vectors $M_1$ and $M_2$ are equal to the measured amplitudes of the magnetic moments of the permanent magnets 42 and 54, respectively. The directions of the vectors $M_1$ and $M_2$ are coincident with the directions of the magnetic moments of the permanent magnets 42 and 54, respectively.

In a step 72, the unit 30 calculates the relative position of the magnet 42 in relation to the position of the magnet 54. In this case, said relative position is given by the distance $d_a$ between the magnets 42 and 54. To this end, the unit 30 calculates the norm for the difference between the positions $P_1$ and $P_2$. By way of example, the distance $d_a$ is calculated using the following relation: $d_a=||P_1-P_2||$, where $||\ldots||$ is a norm such as the Euclidian norm. This distance $d_a$ is representative of the pressure exerted on the tip 12.

Next, in a step 74, the unit 30 converts the distance $d_a$ into a value $P_r$ that is representative of the discrepancy that exists between the current relative position and the initial relative position. The initial relative position is the relative position that is measured in the absence of pressure on the tip 12. In this case, the value $P_r$ is calculated using the following relation: $P_r=(d_0-d_a)/(d_0-d_{min})$.

In a step 76, the unit 30 compares the value $P_r$ with the threshold $S_p$. If value $P_r$ is lower than the threshold $S_p$, then no point of contact between the tip 12 and the medium 6 is detected and no point on the mark is plotted. The method then returns directly to step 66.

In the opposite case, that is to say if the value $P_r$ exceeds the threshold $S_p$, in a step 80, the unit 30 detects a point of contact between the tip 12 and the medium 6.

In response, in a step 82, the unit 30 calculates the orientation of the axis 10 solely from the positions $P_1$ and $P_2$. By way of example, in step 82, the unit 30 sets up the equation defining the position of the axis 10 in the reference frame XYZ in the knowledge that this axis 10 passes through the positions $P_1$ and $P_2$ determined in step 70.

In a step 84, the unit 30 records the position of the point of contact between the tip 12 and the medium 6 in a database containing each plotted position. The set of recorded positions forms the plotted mark. The position of the point of contact corresponds to the coordinates of the point situated on the axis 10, to the distance $d_p$ from the position $P_1$ and from the side of the magnet 42 opposite the side on which the magnet 54 is situated.

In a step 86, the unit 30 calculates the angle $\alpha$ of roll of the pencil 4 about the axis 10 from the determined directions of the magnetic moments of the magnets 42 and 54. The angle $\alpha$ is measured in relation to a pre-recorded reference position. The value of said angle $\alpha$ is then associated, in the database, with the position recorded in step 84.

In a step 88, the unit 30 completes the position recorded in step 84 by associating a line thickness or a luminous intensity or a transparency for the plotted line therewith. The line thickness and/or the luminous intensity and/or the transparency are in this case determined as a function of the value $P_r$ that is calculated in step 74. By way of example, the transparency of the line is adjusted using the method known by the term "Alpha blending".

Following step 88, the method returns to step 66 in order to plot the next point on the drawn mark.

Finally, in a step 90, the unit 30 controls the display, as the mark is plotted, of said mark on a screen. Typically, during the display, the thickness and the luminous intensity of said mark are adjusted as a function of the value $P_r$ and of the angle of roll $\alpha$.

Figure 5:
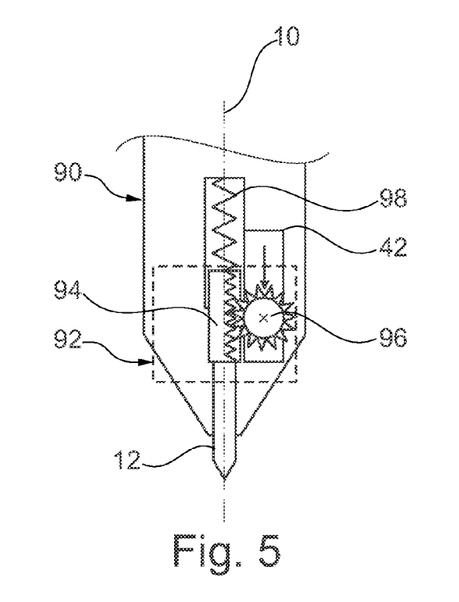
FIGS. 5 and 6 are schematic illustrations of two other embodiments of a pencil that can be used in the system from FIG. 1.

FIG. 5 shows part of a pencil 90. Said pencil 90 is identical to the pencil 4 except that the permanent magnet 42 is moved rotationally rather than translationally when the tip 12 moves translationally along the axis 10. For this, the pencil 90 has a mechanism 92 that is capable of transforming the translation of the tip 12 into a rotation of the magnet 42. Many mechanisms allowing such a conversion to be made are known. Solely by way of illustration, said mechanism 92 may have:
- a rack 94 extending along the axis 10 and fixed without any degree of freedom to the end of the tip 12 that is situated inside the body 8 of the pencil, and
- a cogged wheel 96 that is driven rotationally by the movement of the rack 94.

In this embodiment, the permanent magnet 42 is fixed without any degree of freedom to the wheel 96. As in the previous embodiment of the pencil 4, the pencil 90 comprises return means 98 that continually drive the tip 12 towards its prominent position. By way of example in this case, said return means are likewise formed by a spring.

When the wheel 96 turns, the direction of the magnetic moment of the magnet 42 likewise turns. Thus, the relative orientation of the magnetic moment of the magnet 42 in relation to the orientation of the magnetic moment of the magnet 54 is representative of the pressure exerted on the tip 12. By way of example, said relative orientation is defined by the angle $\theta$ between the directions of the magnetic moments of the magnets 42 and 54.

The operation of the system for plotting a mark using the pencil 90 is similar to that described with reference to FIG. 4 except that steps 72 and 74 are suited to calculating and using the angle $\theta$ as a value that is representative of the pressure exerted on the tip 12 rather than the distance $d_a$.

By way of example, in step 62, a table allowing each value of the angle $\theta$ to be converted into a value $P_r$ that is representative of the discrepancy between the initial value of the angle θ and the currently calculated value thereof is recorded in the memory 34. The angle θ may be greater than 360° if the magnet 42 effects multiple revolutions. In this case the unit 30 is programmed to detect the abrupt passages from 360° to 0° so as to count the number of revolutions effected.

In step 72, the value of the angle θ between the directions of the magnetic moments measured is calculated and then converted, in step 74, into a value $P_r$ by using the table recorded in step 62. In this embodiment, if the permanent magnet 42 is eccentric in relation to the axis 10, then the orientation and the position of the longitudinal axis can be determined by considering that the axis 10 passes through the position $P_2$ and a position $P'_1$. The position $P'_1$ is deduced automatically from the position $P_1$ by shifting it by a predetermined value in the direction of the magnetic moment of the magnet 54. This thus amounts to using the direction of the magnetic moment of the magnet 54.

Figure 6:
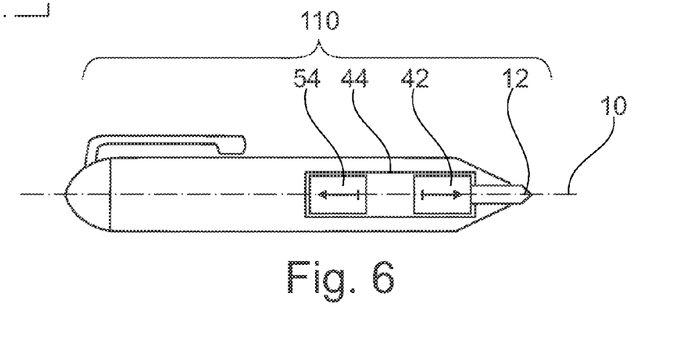

FIG. 6 shows a pencil 110 that is identical to the pencil 4 except that the magnets 42 and 54 are likewise used in order to form the means for returning the tip 12 towards its prominent position.

By way of example, the magnet 54 is fixed without any degree of freedom inside the guide 44 against the stop 48. Its magnetic moment is directed so that it is parallel to the magnetic moment of the magnet 42 but in the opposite direction. Thus, the opposing poles of the magnets 42 and 54 are of the same polarity and repel one another. This allows the tip 12 to be continually driven towards its prominent position.

In this embodiment, given that the magnetic moments of the magnets 42 and 54 are both coincident with the axis 10, the angle of roll of the pencil 110 is not determined, for example if it is not essential owing to the shape of the tip 12, or is determined by a means other than that described previously.

Numerous other embodiments are possible. By way of example, the magnet(s) can be housed either inside or outside the body of the pencil.

The means for returning the tip 12 towards its prominent position can also be produced using a block made of elastomeric material, or any other means that is capable of continually driving the tip 12 towards its prominent position with a force dependent on the movement of said tip.

In the case of the embodiment in FIG. 6, the smallest angle between the directions of the magnetic moments of the magnets 42, 54, measured in a plane containing said two directions, does not need to be zero in order to form the means for returning the tip 12. Thus, as a variant, one of the two magnets 42, 54 is unbalanced so that the smallest angle between the directions of the magnetic moments of said magnets is between 1° and 20°. This small angle between the directions of the magnetic moments allows the poles of the same polarity of the magnets 42 and 54 turned towards one another to be preserved and therefore allows a repulsive force to be obtained that is sufficient to continually drive the tip 12 towards its prominent position. At the same time, this non-zero angle between the directions of the magnetic moments of the permanent magnets 42, 54 also allows the angle of roll of the pencil to be determined To this end, the smallest angle between the directions of the magnetic moments of the magnets 42 and 54 is preferably chosen to be greater than 5° or 10°.

The return means may also be suited to exerting the return force on the tip 12 directly rather than via the magnet 42.

As a variant, the minimum distance that separates the magnets 42, 54 may be less than the minimum distance d that separates two magnetometers $M_{ij}$. By way of example, the distance between the magnets 42, 54 may be shorter if the system of equations that links the measurements from the magnetometers $M_{ij}$ to the positions/orientations of the dipoles involves the use of information or constraints pre-recorded at the position of the magnets in relation to one another. By way of example, the amplitude of the magnetic moments of the magnets 42, 54 may be a data item that is already known and pre-recorded. It is also possible to impose the constraint that the angle θ is a known constant. For example, the distance between magnets 42, 54 may be comprised between d/3 or d/2 and d.

If the magnetic moments of the permanent magnets 42 and 54 are not parallel, as a variant, the tip is not necessarily situated on the longitudinal axis of the pencil. By way of example, the tip 12 extends along its own longitudinal axis parallel to the longitudinal axis of the pencil. From the moment at which the distance between said two longitudinal axes is known, it is possible to determine precisely the position of the tip from the position of the permanent magnets because the angle of roll of the pencil can be determined.

Step 86 of calculating the angle α of roll can be omitted, for example if the tip 12 exhibits symmetry of revolution about the axis 10.

There is another solution for using the value that is representative of the pressure exerted on the tip 12. By way of example, rather than using the discrepancy between the distance $d_0$ and the distance $d_a$ that separates the magnets 42 and 54, it is possible to use a pre-recorded table that associates the value $P_r$ with each measured distance $d_a$. It is also possible to use pre-recorded features of the spring 50, such as its stiffness and its length at rest, to calculate the value $P_r$ from the distance $d_a$.

As a variant, it is also not necessary to convert the distance $d_a$ into a value $P_r$ in order to control or complete the plotting of the mark. By way of example, a pre-recorded table associates with each value of the distance $d_a$ a value for the thickness of the line or for the luminous intensity of the mark. Next, in step 88, the thickness of the line to be associated with the position of the plotted tip is determined directly from this table without calculating the value $P_r$. Equally, in order to detect a point of contact, the measured distance $d_a$ can be compared directly with a pre-recorded threshold $S_d$ beyond which the presence of a point of contact is detected.

Equally, if the value of the angle θ is used as a physical quantity that is representative of the pressure, the unit 30 can use a mathematical relation similar to that used for the translation: $P_r(\theta-\theta_0)/(\theta_{max}-\theta_0)$, where:
  $\theta_0$ is the value of the angle θ in the absence of pressure on the tip 12, and
  $\theta_{max}$ is the maximum value of the angle θ that can be obtained during normal use of the pencil 90.

Other mechanisms for converting the translation of the tip 12 into a rotational movement of the magnet 42 are possible. By way of example, a connecting rod can be used for this purpose.

It is likewise possible to use a mechanism that allows a translational movement of the tip 12 to be converted into a translational and, at the same time, rotational movement of the magnet 42. In this case, both the distance $d_a$ and the angle θ can be used as a quantity that is representative of the pressure exerted on tip 12.

The pencil can also incorporate a mechanism that moves both the magnet 42 and the magnet 54 in relation to the body 8 when the tip 12 moves.

Preferably, the distance $d_a$ and the angle $\theta$ vary in proportion to the pressure exerted on the tip 12. However, as a variant, it is possible to link the magnet 42 to the tip 12 by means of a mechanism that ensures only that there is a bijective relation between the pressure exerted on the tip and the distance $d_a$ or the angle $\theta$. In this case, the distance $d_a$ or the angle $\theta$, used as a quantity that is representative of the pressure, does not necessarily vary in proportion to the pressure exerted on the tip 12.

As a variant, one and the same pencil has more than two permanent magnets separated from one another by distances greater than at least 1 mm. These additional permanent magnets are either magnets that are moved by the tip 12 or magnets that are fixed without any degree of freedom to the body of the pencil.

The writing medium may be cardboard or fabric. In another embodiment, the writing medium is constituted by the tablet 20. In this case, if coloured liquid is deposited by the pencil, it is deposited directly on the face 22 of the tablet 20. By way of example, in this case, the tablet 22 is a picture, a wall or a window.

If the surface of the network of magnetometers is sufficiently extended, the system 2 may simultaneously have multiple pencils. In this case, the method described above is applied, in parallel, for each of said pencils. By way of example, this allows plotting of the mark for multiple users writing simultaneously on the same medium.

Other algorithms for determining the position and/or the orientation of the magnetic objects situated in the pencil are possible. By way of example, the method described in U.S. Pat. No. 6,269,324 can be used. These methods do not necessarily use a Kalman filter. By way of example, the methods described in US2002/171427A1 or U.S. Pat. No. 6,263,230B1 are possible.

The approximation used to construct the Kalman filter may also be a quaternary or higher approximation, that is to say that the electromagnetism equations are approximated to an order higher than that corresponding to dipolar approximation.

The magnetometers in the network of magnetometers are not necessarily arranged in columns and rows. They may also be laid out in other patterns. By way of example, the magnetometers are arranged on each crest of each triangular or hexagonal mesh in a mesh topology for a plane.

The arrangement of the magnetometers in relation to one another may also be random or irregular. Thus, the distance between two immediately consecutive magnetometers in the network is not necessarily the same for all pairs of two immediately consecutive magnetometers. By way of example, the density of magnetometers in a given area of the network may be higher than elsewhere. Increasing the density in a given area can allow an increase in the precision of the measurement in this area. It is also possible to foresee areas of higher density on the periphery of the network in order to limit edge effects. By way of example, the network of magnetometers may have a central area that is devoid of magnetometers. In this case, the magnetometers are distributed only at the periphery of said central area and form a band of magnetometers that surrounds and delimits the central area. Typically, the width of said band is strictly less than the width of the central area measured in the same direction.

Steps 70 to 90 do not need to be executed immediately after steps 66 and 68 of measurement and acquisition of said measurements. Instead, these steps can also be executed on pre-recorded data.

The value of the physical quantity that is representative of the pressure exerted on the tip 12 can be used just to detect the point of contact. In this case, step 88 is omitted. On the contrary, this value can be used just to complete the position of the point of contact with a piece of information relating to the pressure exerted on said tip at the moment at which the position of said point of contact has been recorded. In the latter case, the point of contact is detected differently.

As a variant, the support face 22 is not necessarily planar. By way of example, it may be round or spherical.

In another embodiment, the pencil does not deposit a coloured liquid or solid on the writing medium. By way of example, the pencil is a stylus. However, even in this embodiment, the system 2 allows the mark drawn using the stylus to be plotted. Preferably, in this case, the system 2 is equipped with a man/machine interface allowing the plotted mark to be presented, ideally in real time, for example on a screen, as said mark is plotted. By way of example, in this case, the tablet 20 is a screen on which the plotted mark is displayed in real time.

All that has been stated above in the particular case of a pencil likewise applies to the case of plotting the mark by an eraser on the writing medium. The eraser may be a rubber or may act by depositing a chemical product. Like the pencil, the eraser may also be a simple stylus. In the latter case, the stylus allows just portions of the mark plotted by the system 2 to be erased without having any action on the coloured liquid or solid that is physically deposited on the writing medium. Unlike the pencil, the contact between the tip of the eraser and the writing medium triggers erasure, in the memory 34, of the positions plotted for the pencil that are the same as those plotted for the tip of the eraser. In another embodiment, the contact between the tip of the eraser and the writing medium triggers erasure, in the memory 34, of the positions plotted for the pencil that are contained inside an area of predefined dimensions that is attached to each position plotted for the tip of the eraser. By way of example, the size of the area of predefined dimensions is adjusted on the basis of the value of the physical quantity that is representative of the pressure exerted on the tip of the eraser. Said eraser can be used to erase the mark of a pencil that is plotted using the system 2 or using another system, for example a conventional system.

As a variant, the position of the point of contact between the medium 6 and the tip 12 is plotted using sensors other than the magnetometers $M_{ij}$. By way of example, a camera and an image processing unit that is programmed to determine the position of the point of contact between the tip and the medium from the filmed images are used. In this case, the magnetometers $M_{ij}$ are used only to calculate the value of the quantity that is representative of the pressure on the tip 12.

The invention claimed is:

1. A system for plotting a mark drawn on a writing medium, comprising:
    a tool, chosen from the group consisting of a pencil and an eraser, said tool comprising:
      a body for grasping the tool with a hand of a user,
      a tip adapted to draw the mark to be plotted, said tip being movable by a reactive force exerted on the writing medium when said tip comes to rest on said writing medium, between:
        a prominent position and
        a retracted position in which the tip is pushed inside the body more than in the prominent position,
      a return continually driving the tip towards its prominent position, first and second, separate, permanent magnets, the first permanent magnet being mechanically linked to the tip so as to be moved translationally or rotationally, in relation to the second permanent magnet, as the tip is moved between its prominent and retracted positions, a device adapted to record successive positions of a point of contact between the tip and the medium in order to form the plot of the drawn mark, and of using a value of a physical quantity that is representative of the pressure exerted on the tip of the tool in order to control or complete said recording, wherein the device includes:
a network of magnetometers having N triaxial magnetometers that are mechanically linked to one another without any degree of freedom in order to preserve a known distance between each of said magnetometers, where N is an integer greater than or equal to five, an electronic computer that is programmed in order to:
a) determine, from the measurements from the triaxial magnetometers, the positions of the two permanent magnets and the orientations of the magnetic moments of the two permanent magnets by resolving a predetermined system of equations linking each measurement from a triaxial magnetometer in the network to the positions of the two permanent magnets and to the orientations of the magnetic moments of said two permanent magnets, b) calculate one of the relative position of the first permanent magnet in relation to the position of the second magnet from the positions determined in step a) and the relative orientation of the magnetic moment of the first permanent magnet in relation to the orientation of the magnetic moment of the second permanent magnet from the orientations determined in step a), said calculated relative position or orientation then being used by the device as a value of the physical quantity that is representative of the pressure exerted on the tip.

2. The system according to claim 1, in which the electronic computer is programmed in order to determine the position to be recorded for the point of contact from the position and the orientation of the first permanent magnet determined in step a).

3. The system according to claim 1, in which:
for each permanent magnet that is movable by the tip, the tool has a guide that is fixed without any degree of freedom to the body of the tool, said guide being capable of guiding the movement of the permanent magnet when the tip moves so as to maintain the position of said permanent magnet on a longitudinal axis of the tool passing through the tip and through the position of the other permanent magnet, and the computer is programmed in order to determine the inclination of the tool in relation to the writing medium from the positions determined in step a) and to control the plotting of the mark on the basis of the determined inclination.

4. The system according to claim 1, in which the orientations of the magnetic moments of the first and second permanent magnets continually exhibit an angular shift greater than 5° and less than 175° in a plane containing said two orientations, and the electronic computer is programmed in order to determine the angle of roll of the tool about a longitudinal axis from the measurements from the magnetometers in the network and in order to control the plotting of the mark on the basis of said angle of roll.

5. A tool being chosen from the group consisting of a pencil and an eraser, comprising:
a body for grasping the tool with a hand of a user,
a tip adapted to draw a mark to be plotted, said tip being movable by a reactive force exerted on the writing medium when said tip comes to rest on said writing medium, between:
a prominent position and
a retracted position in which the tip is pushed inside the body more than in the prominent position,
a return device configured to continually drive the tip towards its prominent position,
first and second, separate, permanent magnets, the first permanent magnet being mechanically linked to the tip so as to be moved translationally or rotationally, in relation to the second permanent magnet, in proportion with the movement of the tip between its prominent and retracted positions,
wherein the second permanent magnet is arranged so that, whatever the position of the tip, the second permanent magnet is always separated from the first permanent magnet by a distance of at least 1 mm;
wherein said first permanent magnet exhibits a first pole that is turned towards the second permanent magnet,
said second permanent magnet exhibits a first pole that is turned towards the first pole of the first permanent magnet, the first poles of the first and second permanent magnets being of the same polarity and the smallest angle between the directions of the magnetic moments of the first and second permanent magnets being one of 0° and between 1° and 20°, and
a guide that is capable of guiding the movement of the first permanent magnet so that the first pole of the first permanent magnet approaches the first pole of the second permanent magnet when the tip moves from its prominent position towards its retracted position.

6. The tool according to claim 5, in which the directions of the magnetic moments of the first and second permanent magnets exhibit an angular shift that is continually greater than 5° and less than 175° in a plane containing said two directions.

7. An appliance for determining a physical quantity that is representative of the pressure exerted on the tip of a tool, comprising:
a network of magnetometers having N triaxial magnetometers that are mechanically linked to one another without any degree of freedom in order to preserve a known distance between each of said magnetometers, where N is an integer greater than or equal to five,
an electronic computer that is programmed in order to:
a) determine, from the measurements from the triaxial magnetometers, the positions of the two permanent magnets and the orientations of the magnetic moments of the two permanent magnets by resolving a predetermined system of equations linking each measurement from a triaxial magnetometer in the network to the positions of the two permanent magnets and to the orientations of the magnetic moments of said two permanent magnets,
b) calculate the relative position of the first permanent magnet in relation to the position of the second magnet from the positions determined in step a) and/or calculate the relative orientation of the magnetic moment of the first permanent magnet in relation to the orientation of the magnetic moment of the second permanent magnet from the orientations determined in step a), c) use one of said calculated relative position and said calculated relative orientation as a value of the physical quantity that is representative of the pressure exerted on the tip in order to control or complete a recording of successive positions of a point of contact between the tip and a writing medium.

8. A method for plotting a mark drawn on a writing medium using a tool, chosen from the group consisting of a pencil and an eraser, said tool comprising:

a body forming a means for grasping the tool with a hand of a user, a tip intended to draw, on a writing medium, a mark to be plotted, said tip being movable by the reactive force exerted by the writing medium when said tip comes to rest on said writing medium, between:

a prominent position and a retracted position in which the tip is pushed inside the body more than in the prominent position, return means continually driving the tip towards its prominent position, a first and a second, separate, permanent magnet, the first permanent magnet being mechanically linked to the tip so as to be moved translationally or rotationally, in relation to the second permanent magnet, as the tip is moved between its prominent and retracted positions, said method comprising:

a) the recording of successive positions of a point of contact between the tip and the medium in order to form the plot of the drawn mark, and b) the use of a value of physical quantity that is representative of the pressure exerted on the tip of the tool in order to control or complete said recording, wherein said method comprises:

c) measuring the magnetic field of the first and second permanent magnets by each triaxial magnetometer in a network of magnetometers having N triaxial magnetometers that are mechanically linked to one another without any degree of freedom in order to preserve a known distance between each of said magnetometers, where N is an integer greater than or equal to five, d) determining, from the measurements from the triaxial magnetometers, of the positions of the two permanent magnets and of the orientations of the magnetic moments of said two permanent magnets by resolving a predetermined system of equations linking each measurement from a triaxial magnetometer in a network to the positions of the two permanent magnets and to the orientations of the magnetic moments of said two permanent magnets, and e) calculating one of the relative position of the first permanent magnet in relation to the position of the second magnet from the positions determined in step d) and the relative orientation of the magnetic moment of the first permanent magnet in relation to the orientation of the magnetic moment of the second permanent magnet from the orientations determined in step d), said calculated relative position or orientation then being used in step b) as a value of the physical quantity that is representative of the pressure exerted on the tip.

9. The method according to claim 8, in which step b) comprises:

comparing the physical quantity that is representative of the pressure exerted on the tip at a predetermined contact threshold, detecting a point of contact between the tip and the writing medium if said contact threshold is crossed and, in the opposite case, the absence of detection of the contact point, and controlling the recording of the position of a contact point in order to form the plot of the mark only if a contact point is detected.

10. The method according to claim 8, in which step b) comprises the adjustment of the thickness of the plotted mark on the basis of the value of the physical quantity that is representative of the pressure exerted on the tip, and the adjustment of the luminous intensity and of the transparency of the plotted mark on the basis of the value of the physical quantity that is representative of the pressure exerted on the tip.

11. Software stored on a non-transitory machine-readable medium receiving measurements of a magnetic field of first and second permanent magnets, associated with a tool for writing on a writing medium by a user, derived from each triaxial magnetometers in a network of triaxial magnetometers, wherein the network includes N triaxial magnetometers that are mechanically linked to one another without any degree of freedom in order to preserve a known distance between each of said magnetometers, where N is an integer greater than or equal to five, the software comprising instructions for causing a data processing system to:

determine, from the measurements from the triaxial magnetometers, the positions of the two permanent magnets and of the orientations of the magnetic moments of said two permanent magnets by resolving a predetermined system of equations linking each measurement from a triaxial magnetometer in a network to the positions of the two permanent magnets and to the orientations of the magnetic moments of said two permanent magnets, and calculate the relative position of the first permanent magnet in relation to the position of the second magnet from one of the positions determined and the calculation of the relative orientation of the magnetic moment of the first permanent magnet in relation to the orientation of the magnetic moment of the second permanent magnet from the orientations determined, said calculated relative position or orientation then being used as a value of a physical quantity that is representative of the pressure exerted on a tip of the tool on the writing medium.

* * * * *